United States Patent
Yoshinaka et al.

[11] Patent Number: 6,155,631
[45] Date of Patent: Dec. 5, 2000

[54] REINFORCING MEMBER STRUCTURE FOR VEHICLE BODY

[75] Inventors: Katsunori Yoshinaka, Saitama; Yasuharu Masuda, Tokyo; Kenichi Kameyama, Haga-machi, all of Japan

[73] Assignee: Masuda Manufacturing Co., Ltd., Tokyo, Japan

[21] Appl. No.: 09/199,331

[22] Filed: Nov. 25, 1998

[30] Foreign Application Priority Data

Dec. 1, 1997 [JP] Japan ..................................... 9-330006

[51] Int. Cl.[7] .................................................. B62D 25/14
[52] U.S. Cl. .......................... 296/188; 296/187; 296/189
[58] Field of Search .................................. 293/120–122; 296/194, 203.02, 205, 203.01, 187, 146.6, 188, 189; 280/779

[56] References Cited

U.S. PATENT DOCUMENTS

| | | | |
|---|---|---|---|
| 4,733,739 | 3/1988 | Lorenz et al. ........................... | 280/779 |
| 5,238,286 | 12/1994 | Tanaka et al. ........................... | 296/189 |
| 5,358,300 | 10/1994 | Gray ......................................... | 296/194 |
| 5,370,417 | 12/1994 | Keiman et al. ........................... | 280/751 |

FOREIGN PATENT DOCUMENTS 8-119001  5/1996  Japan .

*Primary Examiner*—D. Glenn Dayoan
*Assistant Examiner*—Greg Blankenship
*Attorney, Agent, or Firm*—Arent Fox Kintner Plotkin & Kahn, PLLC

[57] ABSTRACT

A synthetic resin foam is applied to an outer or inner peripheral surface reinforcing member such as a steering hanger member made of a steel pipe and secured to a vehicle body of an automobile to reinforce the vehicle body. The steering hanger member includes hanger beams made of a steel pipe and connected to left and right front pillars of the vehicle body. Thus, it is possible to obtain a reinforcing member structure for the vehicle body at a low cost, which is capable of effectively enhancing the rigidity of the reinforcing member, while suppressing an increase in weight to the utmost.

4 Claims, 5 Drawing Sheets

REINFORCING MEMBER STRUCTURE FOR VEHICLE BODY

BACKGROUND OF THE INVENTION

1. Field of the Invention

The present invention relates to a reinforcing member structure for a vehicle body of an automobile, a motorcycle or the like.

2. Description of the Related Art

Conventionally, for example, a reinforcing member structure for a vehicle body of an automobile is known, in which a steering hanger member (a reinforcing member) connecting left and right front pillars to each other is formed of a pipe material (see Japanese Patent Application Laid-open No. 8-119001). In designing the reinforcing member, a consideration is given so that the reinforcing member does not resonate with the vibration of a vibrating source such as an engine or the like.

More specifically, if the natural vibration frequency of the reinforcing member corresponds to the vibration frequency of the vibrating source, the reinforcing member is violently vibrated by resonance to provide an uncomfortable feeling to an occupant in the vehicle. To prevent such resonance from being produced, considering that the natural vibration frequency of the reinforcing member is proportional to the rigidity of the reinforcing member, it has conventionally been proposed that the thickness of the pipe material forming the reinforcing member is increased, or the diameter of the pipe material is increased, thereby to enhance the rigidity thereof to the utmost, so that the natural vibration frequency may exceed the usual vibration frequency of the vibrating source.

However, if the thickness of the pipe material is increased, or if the diameter of the pipe material is increased, a large increase in weight is brought about, which is not preferred. In addition, in carrying out the development, expensive various pipe materials must be prepared for the rigidity and vibration tests, resulting in a problem of a largely increased development cost.

Accordingly, it is an object of the present invention to provide a reinforcing member structure for a vehicle body, wherein the rigidity of the reinforcing member can be effectively enhanced, while suppressing the increase in weight to the utmost, and the development cost can be suppressed to a low level.

SUMMARY OF THE INVENTION

To achieve the above object, according to the present invention, there is provided a reinforcing member structure for a vehicle body, comprising a reinforcing member made of a metal and secured to a vehicle body to reinforce the vehicle body, and a synthetic resin foam applied to a portion of the reinforcing member or the entire reinforcing member.

With the above feature, when an external force is applied to the reinforcing member, the synthetic resin foam also generates a stress to contribute to an enhancement in rigidity of the reinforcing member.

Particularly, the synthetic resin foam can be provided with a large thickness, as compared with a non-foamed synthetic resin of the same quality and the same weight and hence, the rigidity of the reinforcing member can be effectively enhanced. Moreover, the synthetic resin foam has a far smaller specific gravity than a metal-made reinforcing member and hence, the increase in weight due to the application of the synthetic resin foam is less, as compared with a case where the outside diameter or thickness of the reinforcing member is increased.

In addition, not only the rigidity but also the natural vibration frequency of the reinforcing member can be easily set as desired by controlling the expansion rate and thickness of the synthetic resin foam. Especially, the rigidity of the reinforcing member can be enhanced without a large increase in weight due to the synthetic resin foam, which leads to that the natural vibration frequency of the reinforcing member indicates a high value. Thus, the natural vibration frequency is largely deviated from a usual vibration frequency of an engine, whereby the resonance can be properly avoided, thus contributing to an enhancement in riding comfort of the vehicle.

Further, in carrying out the development, synthetic resin foams made of different synthetic resin materials and having different expansion rate and thicknesses can be applied to the same reinforcing member to provide various test products for the rigidity and vibration tests at a relatively low cost, which can contribute to a reduction in development cost.

The above and other objects, features and advantages of the invention will become apparent from the following description of the preferred embodiment taken in conjunction with the accompanying drawings.

DETAILED DESCRIPTION OF THE PREFERRED EMBODIMENTS

The present invention will now be described by way of preferred embodiments with reference to the accompanying drawings.

A first embodiment of the present invention shown in FIGS. 1 to 4 will be first described.

Figure 1:
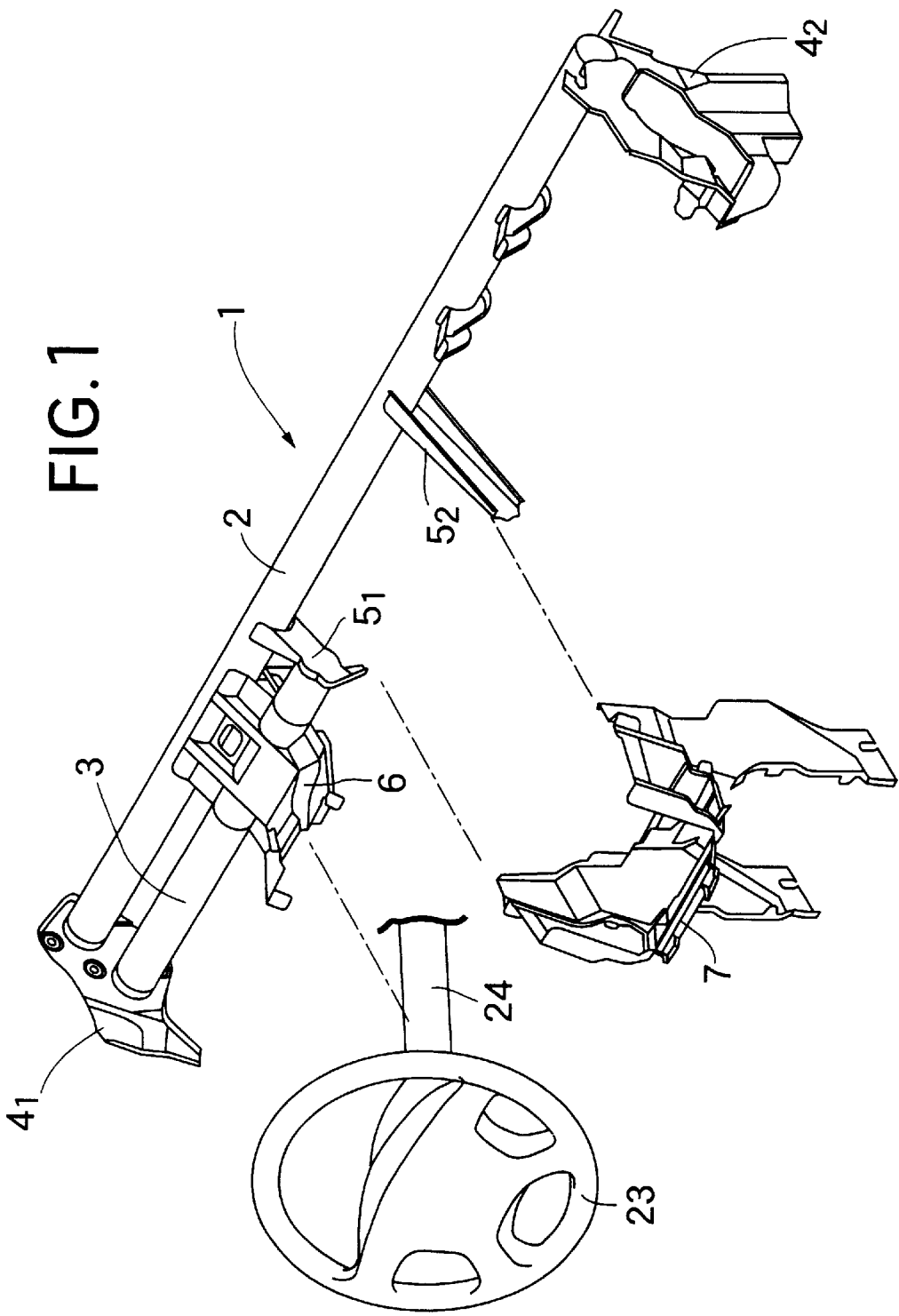
FIG. 1 is a perspective view of a steering hanger member as a reinforcing member in a reinforcing member structure for a vehicle body of an automobile according to a first embodiment of the present invention.

Referring to FIG. 1, reference character 1 shows a steering hanger member which is a reinforcing member for a vehicle body of an automobile. The steering hanger member 1 comprises a longer hanger beam 2 comprised of a steel pipe, a pair of left and right side brackets $4_1$ and $4_2$ welded to opposite ends of the hanger beam 2, a shorter hanger beam 3 welded at one end to the left side bracket $4_1$ and disposed in parallel to the longer hanger beam 2, a left intermediate stay $5_1$ which connects the other end of the shorter hanger beam 3 to an intermediate portion of the longer hanger beam 2, a right intermediate stay $5_2$ coupled to the longer hanger beam 2, so that it is opposed to the left intermediate stay $5_1$, and a column mounting bracket 6 which connects an intermediate portion of the shorter hanger beam 3 to the longer hanger beam 2. The left and right side brackets 4₁ and 4₂ are bolted to left and right front pillars (not shown) of the vehicle body. A steering column 24 supporting a steering wheel 23 is mounted to the column mounting bracket 6, and a console box mounting bracket 7 is secured to the intermediate stays 5₁ and 5₂.

Figure 2:
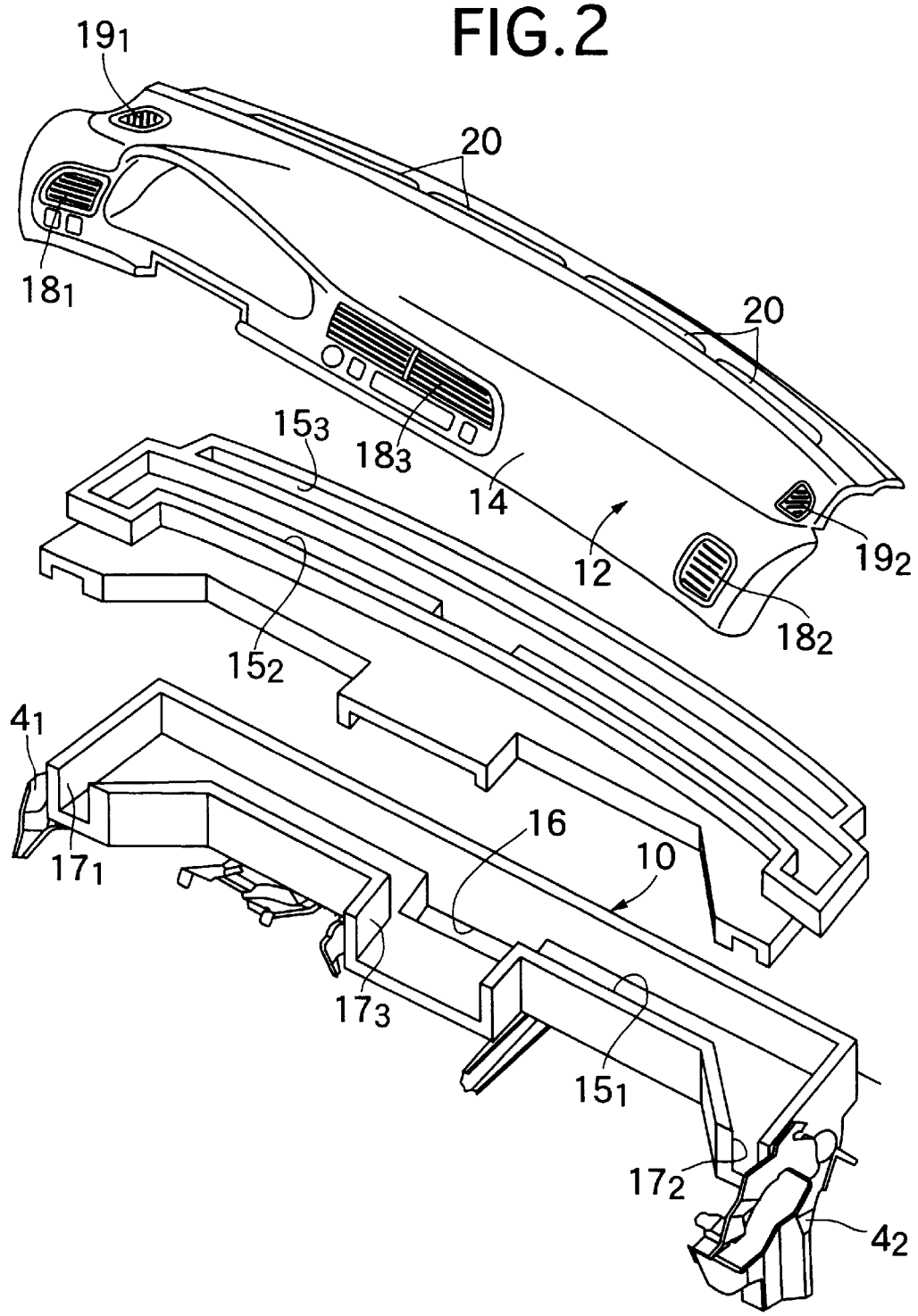
FIG. 2 is an exploded perspective view of an air conditioning duct provided with the steering hanger member.
Figure 3:
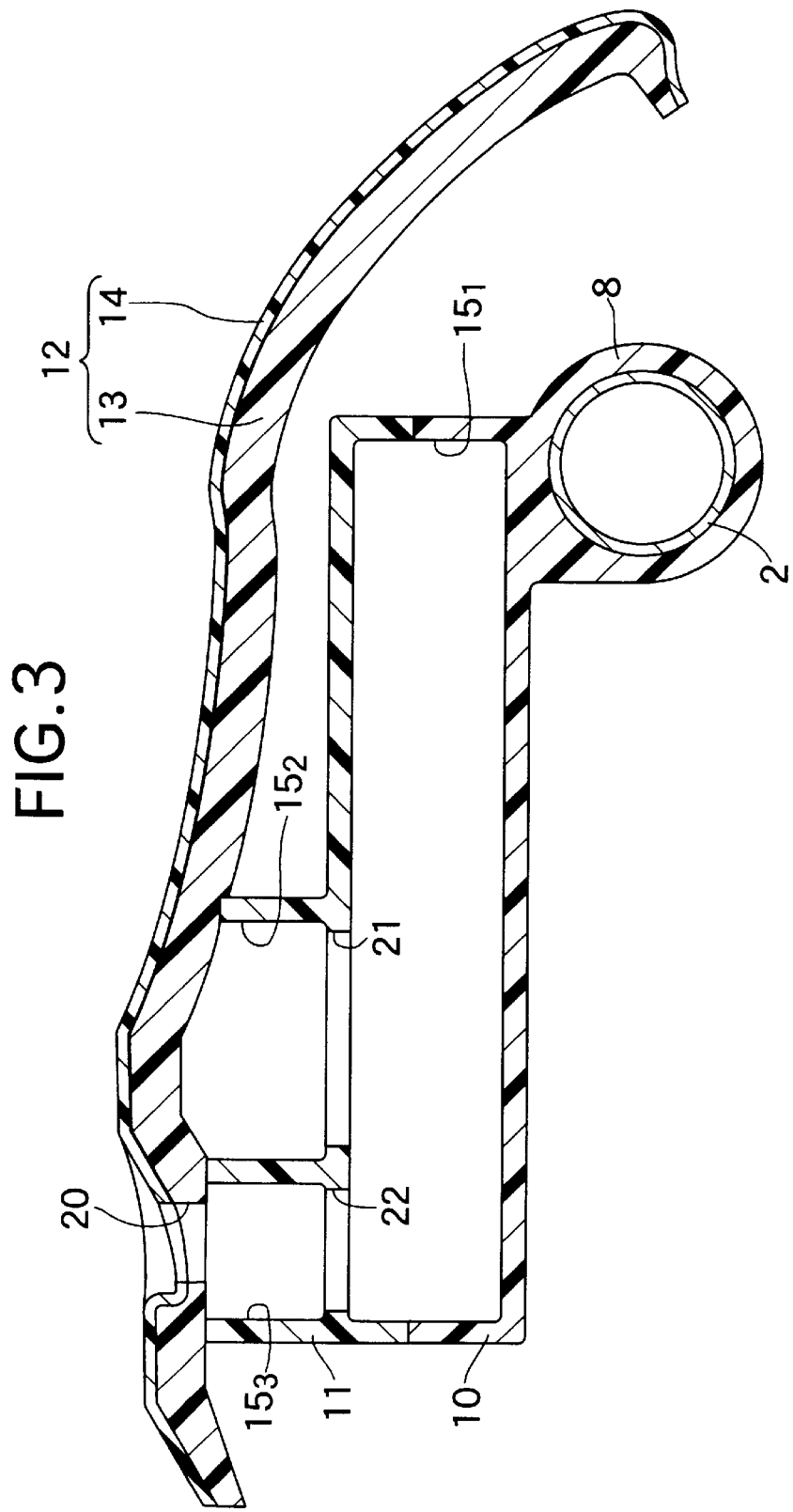
FIG. 3 is a cross-sectional view of the air conditioning duct.

As shown in FIGS. 2 and 3, a synthetic resin foam 8 is applied to outer peripheral surfaces of the longer and shorter hanger beams 2 and 3 of the steering hanger member 1. The synthetic resin foam 8 has a lower duct element 10 integrally provided on an upper portion thereof. Namely, the lower duct element 10 forms a portion of the synthetic resin foam 8, and an upper duct element 11 is bonded to an upper surface of the lower duct element 10, and an instrument panel 12 is bonded to an upper surface of the upper duct element 11.

The upper duct element 11 is formed of a synthetic resin foam which is compatible with the lower duct element 10. The instrument panel 12 is comprised of a panel body 13 made of a synthetic resin foam which is compatible with the upper duct element 11, and a crimped skin 14 of a synthetic resin bonded to a surface of the panel body 13. All the synthetic resin foams are made, for example, of a material of olefinic polypropylene (PP). The lower duct element 10 and the upper duct element 11, as well as the upper duct element 11 and the panel body 13 of the instrument panel 12 are welded to each other by ultrasonic wave.

The lower and upper duct elements 10 and 11 define a first air passage 15₁ extending laterally between the elements 10 and 11, and three outlets 17₁, 17₂ and 17₃ protruding from the first air passage 15₁ toward a vehicle compartment. An inlet 16 is defined in the lower duct element 10 and opens into a central portion of the first air passage 15₁.

The upper duct element 11 and the panel body 13 define a second air passage 15₂ and a third air passage 15₃ which extend laterally between the upper duct element 11 and the panel body 13. Through-bores 21 and 22 are provided in the upper duct element 11 and permit the communication between the first air passage 15, and the second air passage 15₂, and between the first air passage 15, and the third air passage 15₃.

The instrument panel 12 is provided with three front blow-out bores 18₁, 18₂ and 18₃ connected to the three outlets 17₁, 17₂ and 17₃, a pair of left and right side blow-out bores 19₁, and 19₂ communicating with opposite ends of the second air passage 15₂, and a plurality of upper blow-out bores 20 which open from the third air passage 15₃ toward an inner surface of a front window shield (not shown).

Therefore, if an air feed duct of an air conditioner is connected to the inlet 16 and the air conditioner is operated, cold air or warm air can be allowed to flow from the inlet 16 into the first, second and third air passages 15₁, 15₂ and 15₃ and can be blown from the blow-out bores 18₁, 18₂, 18₃, 19₁, 19₂ and 20.

The operation of the embodiment will be described below.

The synthetic resin foam 8 is applied to the longer and shorter hanger beams 2 and 3 of the steering hanger member 1, as described above. Therefore, when an external force is applied to the longer and shorter hanger beams 2 and 3, the synthetic resin foam 8 also generates a stress and resists the external force by cooperation with the longer and shorter hanger beams 2 and 3 to contribute to an enhancement in rigidity of the longer and shorter hanger beams 2 and 3.

A test showed that when a polypropylene (PP) foam having an expansion magnification of 5 and a thickness of 5 mm was applied to a steel pipe having an outside diameter of 60 mm and a thickness of 1.6 mm, the rigidity was increased by 10%, as compared with a steel pipe to which such a coating was not applied.

Particularly, the synthetic resin foam 8 can achieve a large thickness, as compared with a non-foamed synthetic resin of the same quality and the same weight. Therefore, when the synthetic resin foam 8 is applied to the outer peripheral surfaces of the longer and shorter hanger beams 2 and 3, a large outside diameter can be provided to the synthetic resin foam 8, thereby increasing the section modulus of the synthetic resin foam 8 and effectively enhancing the rigidity of the longer and shorter hanger beams 2 and 3. Therefore, the left and right front pillars of the vehicle body can be effectively reinforced with the reinforcing member 1, and the supporting rigidity of the column mounting bracket 6 for the steering column 24 can be effectively enhanced.

Moreover, the synthetic resin foam 8 has a far smaller specific gravity than that of the steel pipe and hence, an increase in weight due to the application of the synthetic resin foam 8 is less, as compared with a case where the outside diameter and the thickness of the steel pipe forming the longer and shorter hanger beams 2 and 3 are increased.

In addition, not only the rigidity of, but also the natural vibration frequency of the longer and shorter hanger beams 2 and 3 can be easily set as desired by controlling the expansion magnification and thickness of the synthetic resin foam 8. Especially, the rigidity of the longer and shorter hanger beams 2 and 3 can be enhanced without a large increase in weight due to the synthetic resin foam 8, which leads to that the natural vibration frequency of the steering hanger beam member 1 shows a higher value. This natural vibration frequency can be largely deviated from a usual vibration frequency, thereby properly avoiding the resonance of the member 1.

Further, in order to find a steering hanger member 1 which does not resonate with the vibration of a vibrating source such as an engine in the development, synthetic resin foams 8 made from different materials and having different expansion magnifications and thickness are applied to the same longer and shorter hanger beams 2 and 3, thereby fabricating various test products, and these test products are tested for the rigidity and the vibration. However, the various test products are inexpensive, because the same longer and shorter hanger beams 2 and 3 are used, thereby the development cost can be suppressed to a remarkably low level.

Figure 4:
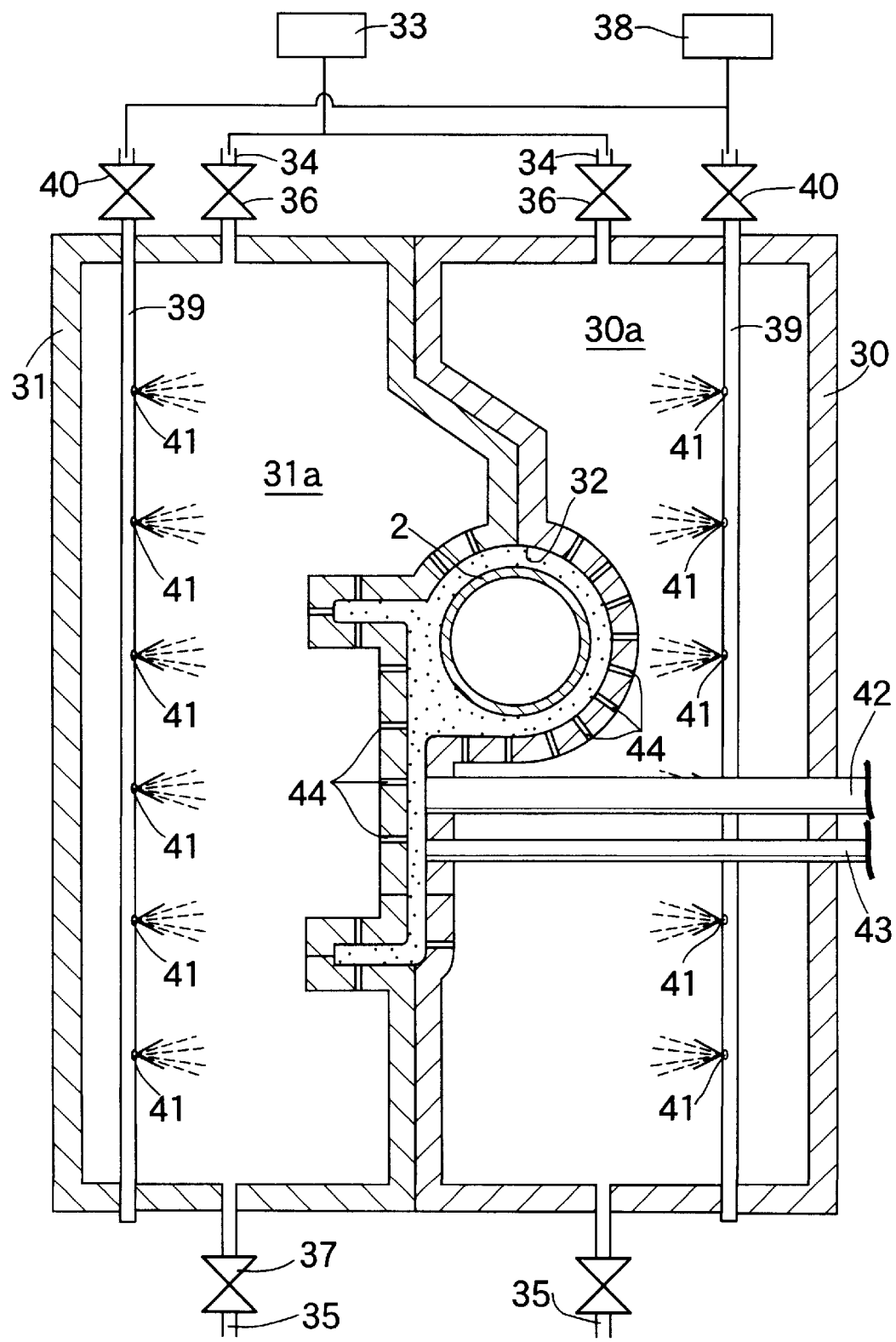
FIG. 4 is a sectional view of an molding apparatus for forming an air conditioning duct provided with the steering hanger member.

A process for forming the synthetic resin foam 8 and the lower duct element 10 will be described below with reference to FIG. 4.

For the purpose of forming them, a stationary die 30 and a movable die 31 which are capable of being opened and closed relative to each other, are prepared. The dies 30 and 31, when being closed, define a cavity 32 therebetween, which is put into the formation of the synthetic resin foam 8 and the lower duct element 10. Each of the dies 30 and 31 is hollow, and a large number of fine bores 44 are provided in the dies 30 and 31 for permitting the communication between hollow insides 30a and 31a of the dies 30 and 31 and the cavity 32.

A vapor introducing pipe 34 connected to a vapor generating device 33 and a discharge pipe 35 are connected to the hollow insides 30a and 31a. An inlet valve 36 and an outlet valve 37 are provided in the vapor introducing pipe 34 and the discharge pipe 35, respectively. A cooling water pipe 39 is disposed in each of the hollow inside 30a and 31a and connected to a cooling water supply device 38. The cooling water pipe 39 includes an on-off valve 40 provided at its upstream portion, and a large number of nozzles 41 which are provided within the hollow insides 30a and 31a and which open toward the cavity 32.

The stationary die 30 is provided with an injector 42 for supplying previously foamed beads into the cavity 32, and a push-out pin 43 for releasing a molded product from the stationary die.

To carry out the molding, the longer and shorter hanger beams 2 and 3 (not shown in FIG. 4) are first clamped between the dies 30 and 31, so that they are passed through a predetermined area of the cavity 32, while closing the dies 30 and 31, and previously foamed beads of a synthetic resin are supplied from the injector 42 into the cavity 32. Then, the inlet valve 36 in the vapor introducing pipe 34 is opened to supply water vapor of a high temperature into the hollow insides 30a and 31a in the dies 30 and 31, thereby injecting the water vapor through the large number of fine bores 44 into the cavity 32. This causes the previously foamed beads within the cavity 32 to be heated and expanded to fill the cavity 32. Thus, the synthetic resin foam 8 and the lower duct element 10 are formed, and at the same time, the synthetic resin foam 8 is applied to the outer peripheral surfaces of the longer and shorter hanger beams 2 and 3.

After a lapse of a predetermined expanding time, the inlet valve 36 is closed, and the outlet valve 37 in the discharge pipe 35 and the on-off valve 40 in the cooling water pipe 39 are opened to inject cooling water from the large number of nozzles 41 in the cooling water pipe 39 toward the cavity 32, thereby cooling the dies 30 and 31 around the cavity 32 and a molded product. After the cooling, the opening of the dies is carried out, and the push-out pin 43 is operated, thereby removing the molded product.

Figure 5:
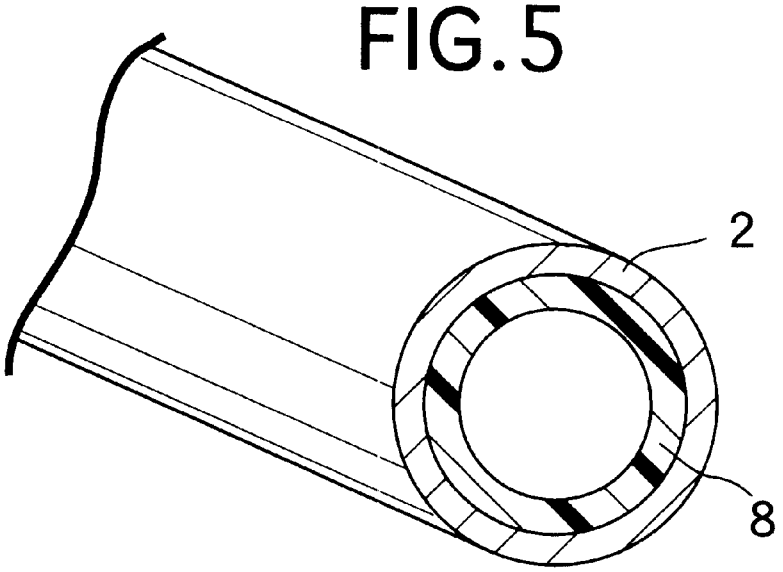
FIG. 5 is a cross-sectional view of a reinforcing member structure according to a second embodiment of the present invention.

FIG. 5 shows a second embodiment of the present invention. In order to reinforce the longer and shorter hanger beams 2 and 3 made of a steel pipe, a synthetic resin foam 8 is applied to inner peripheral surfaces of the longer and shorter hanger beams 2 and 3 with a given thickness.

Figure 6:
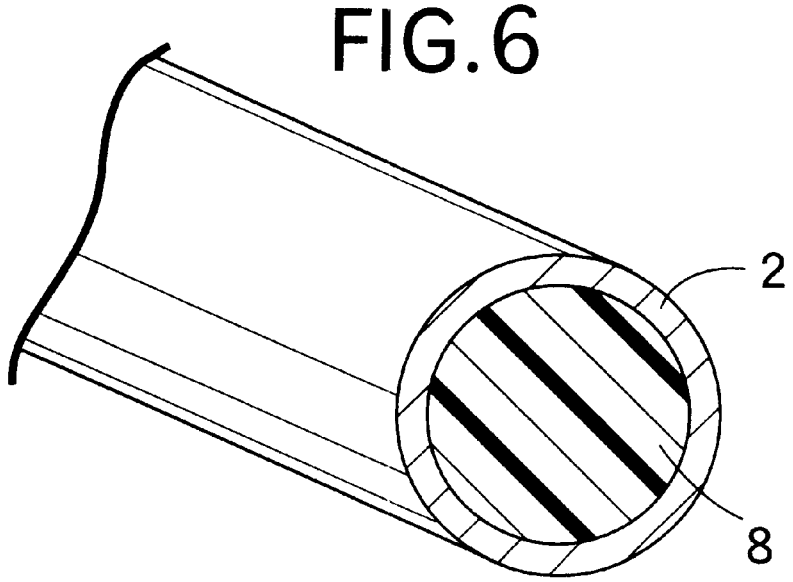
FIG. 6 is a cross-sectional view of a reinforcing member structure according to a third embodiment of the present invention.

FIG. 6 shows a third embodiment of the present invention. In order to reinforce the longer and shorter hanger beams 2 and 3 made of a steel pipe, a synthetic resin foam 8 is applied to inner peripheral surfaces of the longer and shorter hanger beams 2 and 3, so that it is tightly filled in hollow insides of the longer and shorter hanger beams 2 and 3.

The present invention is not limited to the above-described embodiments, and various modifications may be made in a scope departing from the subject matter of the present invention. For example, it is not necessarily required that the synthetic resin foam 8 is applied to the entire outer peripheral surfaces of the longer and shorter hanger beams 2 and 3, and the synthetic resin foam 8 may be applied only to those portions of the outer peripheral surfaces of the longer and shorter hanger beams 2 and 3, which particularly require an enhancement in rigidity.

What is claimed is:

1. A reinforcing member structure for a vehicle body, comprising a reinforcing member made of a metal and secured to a vehicle body to reinforce said vehicle body, and a synthetic resin foam applied to a portion or an entirety of the reinforcing member around a whole periphery of said reinforcing member for enhancing the rigidity of said reinforcing member and for adjusting a vibration characteristic of said reinforcing member.

2. A reinforcing member structure for a vehicle body according to claim 1, wherein said reinforcing member is formed of a pipe material, and said synthetic resin foam is applied to an outer peripheral surface of said reinforcing member.

3. A reinforcing member structure for a vehicle body according to claim 1, wherein said reinforcing member is a steering hanger member comprising hanger beams made of a steel pipe and connected to a front pillar of the vehicle body of an automobile, and a column mounting bracket welded to said hanger beams for mounting a steering column, and said synthetic resin foam is applied to, at least, a portion of said hanger beams or the entire hanger beams.

4. A reinforcing member structure for a vehicle body, comprising a reinforcing member made of a metal and secured to a vehicle body to reinforce said vehicle body, and a synthetic resin foam applied to a portion or an entirety of the reinforcing member, wherein said reinforcing member is formed of a pipe material, and said synthetic resin foam is applied to an outer peripheral surface of said reinforcing member.

* * * * *